United States Patent
Kim et al.

(10) Patent No.: US 9,894,027 B2
(45) Date of Patent: Feb. 13, 2018

(54) ELECTRONIC DEVICE AND METHOD FOR CONTROLLING NOTIFICATION SETTING OF MESSAGE

(71) Applicant: Samsung Electronics Co., Ltd., Gyeonggi-do (KR)

(72) Inventors: Byeong Jun Kim, Gyeonggi-do (KR); Jae Hyun Kim, Gyeonggi-do (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 314 days.

(21) Appl. No.: 14/595,728

(22) Filed: Jan. 13, 2015

(65) Prior Publication Data

US 2015/0200900 A1 Jul. 16, 2015

(30) Foreign Application Priority Data

Jan. 13, 2014 (KR) ........................ 10-2014-0004129

(51) Int. Cl.
  *G06F 3/0484* (2013.01)
  *H04L 12/58* (2006.01)

(52) U.S. Cl.
  CPC .................................. *H04L 51/24* (2013.01)

(58) Field of Classification Search
  CPC .............................. H04L 51/24; H04L 12/587
  See application file for complete search history.

(56) References Cited

U.S. PATENT DOCUMENTS

| | | | |
|---|---|---|---|
| 7,302,253 B2* | 11/2007 | Moody | H04M 1/72547 455/412.2 |
| 8,350,671 B2 | 1/2013 | Kim | |
| 8,412,282 B2* | 4/2013 | Yoon | H04M 1/72547 345/156 |
| 9,538,342 B2* | 1/2017 | Ramanujam | H04W 4/14 |
| 2005/0143103 A1* | 6/2005 | Bjorgan | H04M 3/42051 455/466 |
| 2007/0073848 A1* | 3/2007 | Fratti | G06Q 10/107 709/220 |
| 2007/0105572 A1 | 5/2007 | Kim | |
| 2008/0205610 A1* | 8/2008 | Bishop | H04L 51/24 379/93.24 |
| 2013/0288722 A1* | 10/2013 | Ramanujam | H04W 4/14 455/466 |

(Continued)

FOREIGN PATENT DOCUMENTS

| | | | |
|---|---|---|---|
| JP | 2006260183 A | * | 9/2006 |
| KR | 10-2006-0033227 | | 4/2006 |
| KR | 100686579 B1 | | 2/2007 |

OTHER PUBLICATIONS

English translation of JP 2006260183 A, Seto, "Email Terminal Device," Sep. 28, 2006.*

(Continued)

*Primary Examiner* — Alvin Tan (57) ABSTRACT

An electronic device includes an input unit configured to receive user input; a communication unit configured to transmit and receive message; and a controller configured to set an outgoing message to at least one notifications of a plurality of message notifications according to the user input received by the input unit, and to notify of reception of an incoming message to a user by at least one notifications of the plurality of message notifications included in the incoming message.

16 Claims, 8 Drawing Sheets

(56) References Cited

U.S. PATENT DOCUMENTS

2014/0173000 A1* 6/2014 Brown .................. H04L 51/24
709/206

OTHER PUBLICATIONS

Foreign Communication from Related Counterpart Application; Korean Patent Application No. 10-2014-0004129; Notice of Office Action dated Jun. 14, 2017; 11 pages.

* cited by examiner

ELECTRONIC DEVICE AND METHOD FOR CONTROLLING NOTIFICATION SETTING OF MESSAGE

CROSS-REFERENCE TO RELATED APPLICATION(S) AND CLAIM OF PRIORITY

The present application is related to and claims priority of Korean patent application No. 10-2014-0004129 filed Jan. 13, 2014, the disclosure of which is hereby incorporated in its entirety by reference.

TECHNICAL FIELD

The present disclosure relates to an electronic device and method for controlling a notification setting of a message.

BACKGROUND

A message including generally used text message, multimedia message, and chatting message notifies a message notification to a receiver upon the receipt of the message on the basis of a notification mode preset in an electronic device of the receiver.

Since upon the receipt of the message as above, the message notification occurs on the basis of the notification mode that the receivers presets in the electronic device regardless of a situation of the receiver, the receiver needs to set a notification mode appropriate for his/her situation each time.

Additionally, if bell sound or vibration occurs by a received message under the condition that the receiver does not set the notification mode of the electronic device to be appropriate for his/her situation, uncomfortable situations may occur regardless of the receiver's intention or a sender's intention.

SUMMARY

To address the above-discussed deficiencies, it is a primary object to provide an electronic device of a message sender and method for controlling a notification setting of a message to set a notification mode of an electronic device of a message receiver when the message receiver receives a message.

According to an embodiment of the present disclosure, an electronic device includes: an input unit configured to receive user input; a communication unit configured to transmit and receive message; and a controller configured to set an outgoing message to at least one notifications of a plurality of message notifications according to the user input received by the input unit, and to notify of reception of an incoming message to a user by at least one notifications of the plurality of message notifications included in the incoming message.

According to an embodiment of the present disclosure, a method performed by an electronic device includes receiving a user input; setting an outgoing message to at least one notifications of a plurality of message notifications according to the user input received by the input unit; and transmitting the outgoing message to a device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, embodiments of the present disclosure will be described in more detail with reference to the accompanying drawings. Various modifications are possible in various embodiments of the present disclosure and specific embodiments are illustrated in drawings and related detailed descriptions are listed. Thus, it is intended that the present disclosure covers the modifications and variations of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

In this disclosure, expressions "transmission" and "reception" may modify various components but do not limit them. For instance, such terms do not limit the order and/or priority of the elements. Furthermore, such terms may be used to distinguish one element from another element. For instance, both "a first electronic device" and "a second electronic device" indicate a user electronic device but indicate different user electronic devices from each other. For example, a first electronic device may be referred to as a second electronic device and vice versa without departing from the scope of the inventive concept.

Terms used in this specification are used to describe specific embodiments, and are not intended to limit the scope of the present disclosure. The terms of a singular form may include plural forms unless they have a clearly different meaning in the context.

Unless otherwise defined herein, all the terms used herein, which include technical or scientific terms, may have the same meaning that is generally understood by a person skilled in the art. It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to the present disclosure may be a device having a communication function. For example, an electronic device may be a device transmitting/receiving a message to/from other users, for example, smartphones, tablet personal computers, mobile phones, and personal digital assistants.

Hereinafter, an electronic device according to various embodiments of the present disclosure will be described in more detail with reference to the accompanying drawings.

Figure 1:
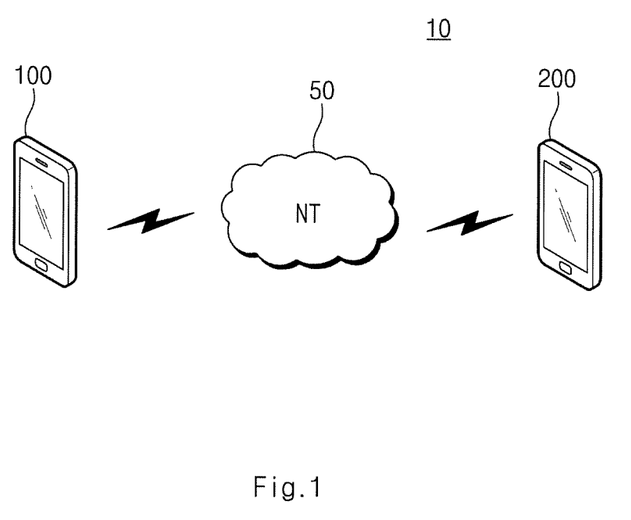
FIG. 1 is a block diagram illustrating a system controlling a notification setting of a message according to an embodiment of the present disclosure.

FIG. 1 is a block diagram illustrating a system controlling a notification setting of a message according to an embodiment of the present disclosure.

Referring to FIG. 1, a notification mode control system 10 may include a first electronic device 100, a network 50 and a second electronic device 200. In the description below, a transmission function of the first electronic device 100 will be mainly described for convenience of description but the first electronic device 100 may operate as a device performing a reception function. Additionally, a reception function of the second electronic device 200 will be mainly described for convenience of description but the second electronic device 200 may operate as a device performing a transmission function.

The first electronic device 100 may transmit a message to the second electronic device 200 through the network 50. At this point, the first electronic device 100 may input information on a first notification mode into package data of a message and may then transmit the message to the second electronic device 200. The information on the first notification mode may include information relating an adjustment request for a notification mode of the second electronic device 200 regarding the message. Upon the receipt of the message including the information on the first notification mode, the second electronic device 200 may check the information on the first notification mode. The second electronic device 200 may adjust a notification mode for reception of the message on the basis of the checked information according to the message reception. The second electronic device 200 may not adjust the notification mode, but maintain the notification mode on the basis of setting information regardless of the information on the first notification mode.

Figure 2:
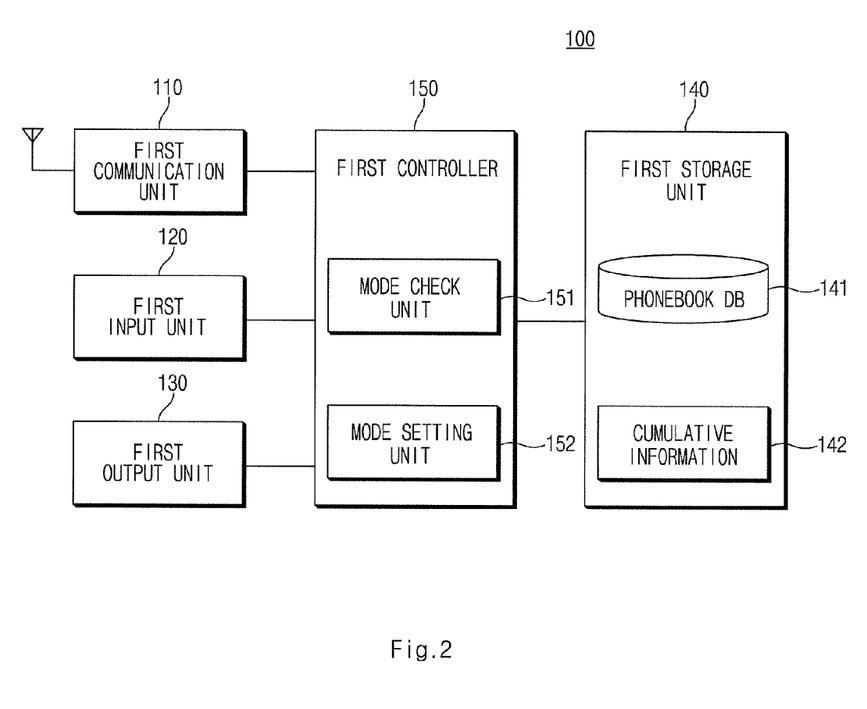
FIG. 2 is a block diagram illustrating a first electronic device transmitting a message according to an embodiment of the present disclosure.

FIG. 2 is a block diagram illustrating a first electronic device transmitting a message according to an embodiment of the present disclosure.

Referring to FIG. 2, a first electronic device 100 may include a first communication unit 110, a first input unit 120, a first output unit 130, a first storage unit 140, and a first controller 150. The first storage unit 140 may include a phonebook DB 141 and cumulative information 142 and the first controller 150 may include a mode check unit 151 and a mode setting unit 152.

The first communication unit 110 may connect a communication between the first electronic device 110 and an external device (for example, a second electronic device 200 or a server (not shown)). For example, the first communication unit 110 may communicate with the external device through wireless communication or wired communication. The wireless communication may include at least one of wireless fidelity (Wi-Fi), Bluetooth (BT), near field communication (NFC), or cellular communication (for example, LTE, LTE-A, CDMA, WCDMA, UMTS, WiBro, or GSM). Additionally, the first communication unit 110 may provide voice calls, video calls, chatting messages, text message services, multimedia message services, or internet services by using the cellular communication. The wired communication may include at least one of universal serial bus (USB), high definition multimedia interface (HDMI), recommended standard 232 (RS-232), or plain old telephone service (POTS), for example. The first communication unit 110 may transmit, to the second electronic device 200, a message including information on a first notification mode.

The first input unit 120 may generate an operation signal for operating the first electronic device 100 in response to an input from the outside and may then provide the operation signal to the first controller 150. For example, the first input unit 120 may generate an executing signal for a message writing environment or message writing mode, such as a message writing application in response to an input from the outside, and may generate a first notification mode selection signal for setting a second notification mode set in the second electronic device 200 in the message writing application. For this, the first input unit 120 may include an input device, for example, a key button, a keyboard, a keypad, a touchpad, and a touch screen to receive the input from the outside.

The first output unit 130 may display an execution screen operated in response to a control of the first controller 150. For this, the first output unit 130 may include a liquid crystal display (LCD). The first output unit 130 may be combined with the touch screen serving as the first input unit 120. If the first output unit 130 combined with the touch screen, the first output unit 130 may display a virtual character keyboard for message input and a virtual button for selecting a first notification mode.

The first storage unit 140 may store programs or applications operated on the first electronic device 100. Additionally, the first storage unit 140 may include a phonebook DB 141 storing other information such as a plurality of phone numbers, and include cumulative information 142 storing the number of unchecked message signals received from the second electronic device 200. The unchecked message signal may be generated at the second electronic device 200 when a user of the second electronic device 200 do not check or read the message.

The first controller 150 may set packet data of a message to correspond to a first notification mode, and then may control (or allow) the first communication unit 110 to transmit, to the second electronic device 200, the message including the packet data corresponding to the first notification mode.

According to an embodiment, the first controller 150 may control the first output unit 130 to output (or display) an execution screen for a message writing application. For example, the first controller 150 may control the output of the message writing application based on a specific event, for example, an event for requesting of the message writing application. The first controller 150 may select a first notification mode in a message writing application, for example, the message writing environment based on an input which is detected by the first input unit 120. At this point, a type of the first notification mode may include a mute mode, a lamp flash mode, a vibration mode, and a ring tone mode, and also may include a combined mode of at least two modes.

The mode check unit 151 may control the first output unit 130 to output a mode selection list to select at least one mode included in the first notification mode. The mode selection list may be output by an input requesting the mode selection list, or may be basically output in the message writing window application without the input. The mode check unit 151 may check the type of the first notification mode selected by the first input unit 120.

The mode setting unit 152 may input information on the first notification mode into packet data of the message to be transmitted to the second electronic device 200 based on the checked type of the first notification mode. For example, the mode setting unit 152 may input the information on the first notification mode into an unused Reserved Field of the packet data when configuring the packet data of the message. According to an embodiment, the mode setting unit 152 may set packet data corresponding to information including two bits of 11 if the first notification mode is a mute mode, two bits of 10 if the first notification mode is a lamp flash mode, two bits of 01 if the first notification mode is a vibration mode, and two bits of 00 if the first notification mode is a ring tone mode. Upon completing the setting of the packet data, the first controller 150 may control the first communication unit 110 to transmit the message including the information on the first notification mode to the second electronic device 200.

According to various embodiments, the first controller 150 may receive, from the second electronic device 200 via the first communication unit 110, a feedback signal relating to whether the reception of a message transmitted to the second electronic device 200 is checked. Upon the receipt of a message unchecked signal from the second electronic device 200, the first controller 150 may accumulate the number of message unchecked signals in the cumulative information 142. In some embodiment, the first controller 150 may automatically set the first notification mode based on the number of message unchecked signals accumulated in the cumulative information 142. For example, the first controller 150 may automatically set the first notification mode of a message to be transmitted to the second electronic device 200 to a ring tone mode if the number of message unchecked signals relating to a message transmitted as a mute mode to the electronic device 200 is greater than a predetermined number of times.

According to various embodiments, after transmitting the message including the first notification mode, the first communication unit 110 may not receive the message checked signal as feedback from the second electronic device 200 with a predetermined time. At this point, the first controller 150 may control the first communication unit 110 to automatically retransmit the transmitted message with another mode.

The network 50 may relay wireless communication of the first electronic device 100 and the second electronic device 200. For this, the network 50 may relay at least one wireless communication of wireless fidelity (Wi-Fi), Bluetooth (BT), near field communication (NFC), or cellular communication (for example, LTE, LTE-A, CDMA, WCDMA, UMTS, WiBro, or GSM). Additionally, the network 50 may provide voice calls, video calls, chatting messages, text message services, multimedia message services, or internet services between the first electronic device 100 and the second electronic device 200 by using the cellular communication.

The second electronic device 200 may perform a communication with the first electronic device 100 through the network 50 and may check the first notification mode by checking (or parsing) the packet data of the message received from the first electronic device 100. The second electronic device 200 may adjust or maintain a notification mode for reception of the message by reflecting the checked first notification mode.

Figure 3:
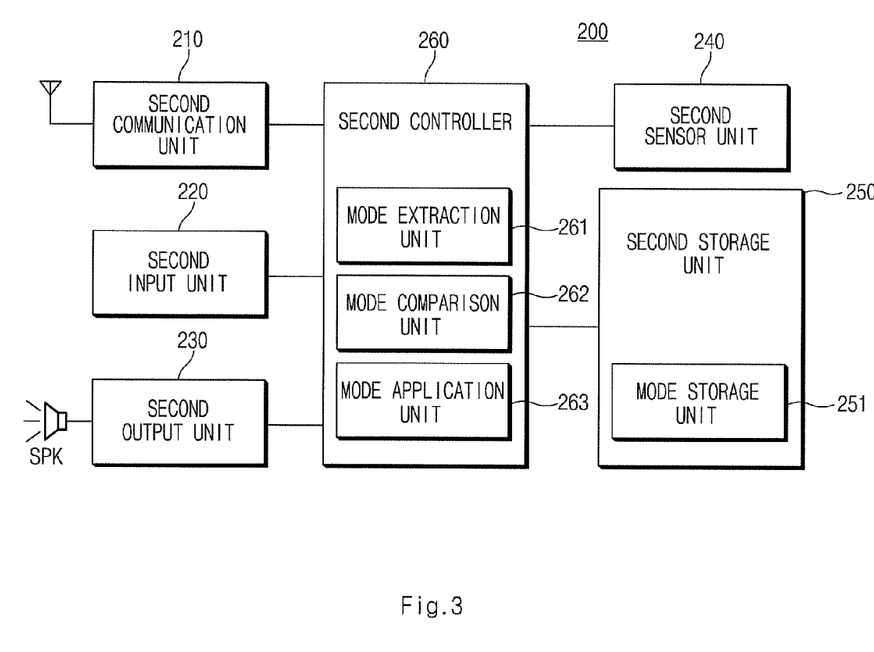
FIG. 3 is a block diagram illustrating a second electronic device receiving a message according to an embodiment of the present disclosure.

FIG. 3 is a block diagram illustrating an electronic device receiving a message according to an embodiment of the present disclosure.

Referring to FIG. 3, a second electronic device 200 may include a second communication unit 210, a second input unit 220, a second output unit 230, a second sensor unit 240, a second storage unit 250, and a second controller 260. The second storage unit 250 may include a mode storage unit 251, and the second controller 260 may include a mode extraction unit 261, a mode comparison unit 262, and a mode application unit 263.

The second communication unit 210 may connect a communication between the second electronic device 200 and an external device (for example, a first electronic device 100 or a server (not shown)) through the network 50. For example, the second communication unit 210 may communicate with an external device through wireless communication or wired communication. The wireless communication may include at least one of wireless fidelity (Wi-Fi), Bluetooth (BT), near field communication (NFC), or cellular communication (for example, LTE, LTE-A, CDMA, WCDMA, UMTS, WiBro, or GSM). Additionally, the second communication unit 210 may provide voice calls, video calls, chatting messages, text message services, multimedia message services, or internet services by using the cellular communication. The wired communication may include at least one of universal serial bus (USB), high definition multimedia interface (HDMI), recommended standard 232 (RS-232), or plain old telephone service (POTS), for example.

Especially, the second communication unit 210 may receive a message including information on a first notification mode from the first electronic device 100. At this point, the second communication unit 210 may receive the message including the information on the first notification mode through at least one of a chatting channel, a short text message service channel, and a multimedia message service channel, etc. In response to a control of the second controller 260, the second communication unit 210 may transmit, to the first electronic device 100, a message unchecked signal or a message checked signal for the received message.

The second input unit 220 may generate an operation signal for operating the second electronic device 200 in response to an input from the outside and may then provide the operation signal to the second controller 260. For example, the second input unit 220 may generate a check signal on checking or reading a message received from the first electronic device 100 according to an input from the outside. For this, the second input unit 220 may include an input device, for example, a keyboard, a keypad, a touchpad, and a touch screen.

The second output unit 230 may display various screens operating in response to a control of the second controller 260. The second output unit 230 may include a liquid crystal display (LCD), and may combined with a touch screen serving as the second input unit 220. If the second output unit 230 combined with the touch screen, the second output unit 230 may display a virtual button for checking a message which is received from the first electronic device 100. The second output unit 230 may display the message received from the first electronic device 100. Furthermore, the second output unit 230 may include a speaker (SPK) for notifying that the message is received in a ring tone.

The second sensor unit 240 may be implemented by using a vibration sensor. For example, the second sensor unit 240 may output a message reception notification in vibration. In some embodiments, the second sensor unit 240 may output a message reception notification in a specific vibration pattern in correspondence to a first notification mode included in the received message.

The second storage unit 250 may store programs or applications operated on the second electronic device 200. Additionally, the second storage unit 250 may include a mode storage unit 251 for storing a second notification mode corresponding to the second electronic device 200.

The second controller 260 may check a first notification mode from the packet data included in the message received from the first electronic device 100, and may reflect the first notification mode to a message reception notification.

In some embodiments, each of the first notification mode and the second notification mode may include a priority for message notification to be occurred in the second electronic device 200 (referred in Table 1). The mode extraction unit 261 of the second controller 260 may check the priority of the first notification mode from information on the first notification mode inputted into the Reserved Field of the packet data. The mode extraction unit 261 may check the priority of a preset second notification mode from the mode storage unit 251 of the second storage unit 250. In relation to this, electronic devices according to various embodiments may support a priority setting of a notification mode. For example, the first electronic device 100 may provide a setting menu or a setting window relating to a priority setting for the first notification mode. A first notification mode priority setting function may be provided from a first notification mode selection list. The second electronic device 200 may provide a setting menu or a setting window relating to a second notification mode priority setting. For example, a second notification mode priority setting function may be provided from a second notification mode setting menu or a setting window. If there is no priority setting, a priority value defined as default may be set.

The mode comparison unit 262 may compare the received priority of the first notification mode and the priority of the second notification mode, and may then provide a comparison result to the mode application unit 263. When the first notification mode priority is higher than or equal to the second notification mode priority, the mode comparison unit 262 may request first notification mode based notification output to the mode application unit 263. When the first notification mode priority is lower than the second notification mode priority, the mode comparison unit 262 may request second notification mode based notification output to the mode application unit 263. In some embodiments, if the priorities of the first notification mode and the second notification mode are the same, the mode comparison unit 262 may recognize that the first notification mode priority is higher than the second notification mode priority. Or, if the priority is the same, the mode comparison unit 262 may recognize that the second notification mode priority is higher than the first notification mode priority.

The mode application unit 263 may output a message reception notification according to the request of the mode comparison unit 262. For example, the mode application unit 263 may perform a mute mode message reception notification on the basis of the first notification mode. The mode application unit 263 may perform a ring tone mode message reception notification on the basis of the second notification mode. Then, upon the receipt of a request signal for checking or outputting the message from the second input unit 220, the second controller 260 may output the message received from the first electronic device 100 via the second output unit 230.

According to various embodiments, if the request signal for checking or outputting the message is not received from the second input unit 220 for a predetermined time, the second controller 260 may allow the second communication unit 210 to transmit, to the first electronic device 100, an unchecked message signal notifying that message checking is not performed.

In some embodiments, if the second communication unit 210 received messages several times from the first electronic device 100 based on the first notification mode, and didn't check the messages, the second controller 260 may change the first notification mode to the second notification mode. For example, the second controller 260 may receive a plurality of messages for a predetermined time from the same first electronic device 100. While performing a message reception notification according to the first notification mode, if the number of message receptions is greater than a predetermined number within a predetermined time, the second controller 260 may perform a message reception notification according to the second notification mode.

As described above, the function of controlling a notification mode of the second electronic device 200 may be mounted as an electronic device is manufactured. Furthermore, the function may be performed on an application. The first electronic device 100 and the second electronic device 200 may perform the function by downloading and installing the application from a server device such as app market.

Figure 4:
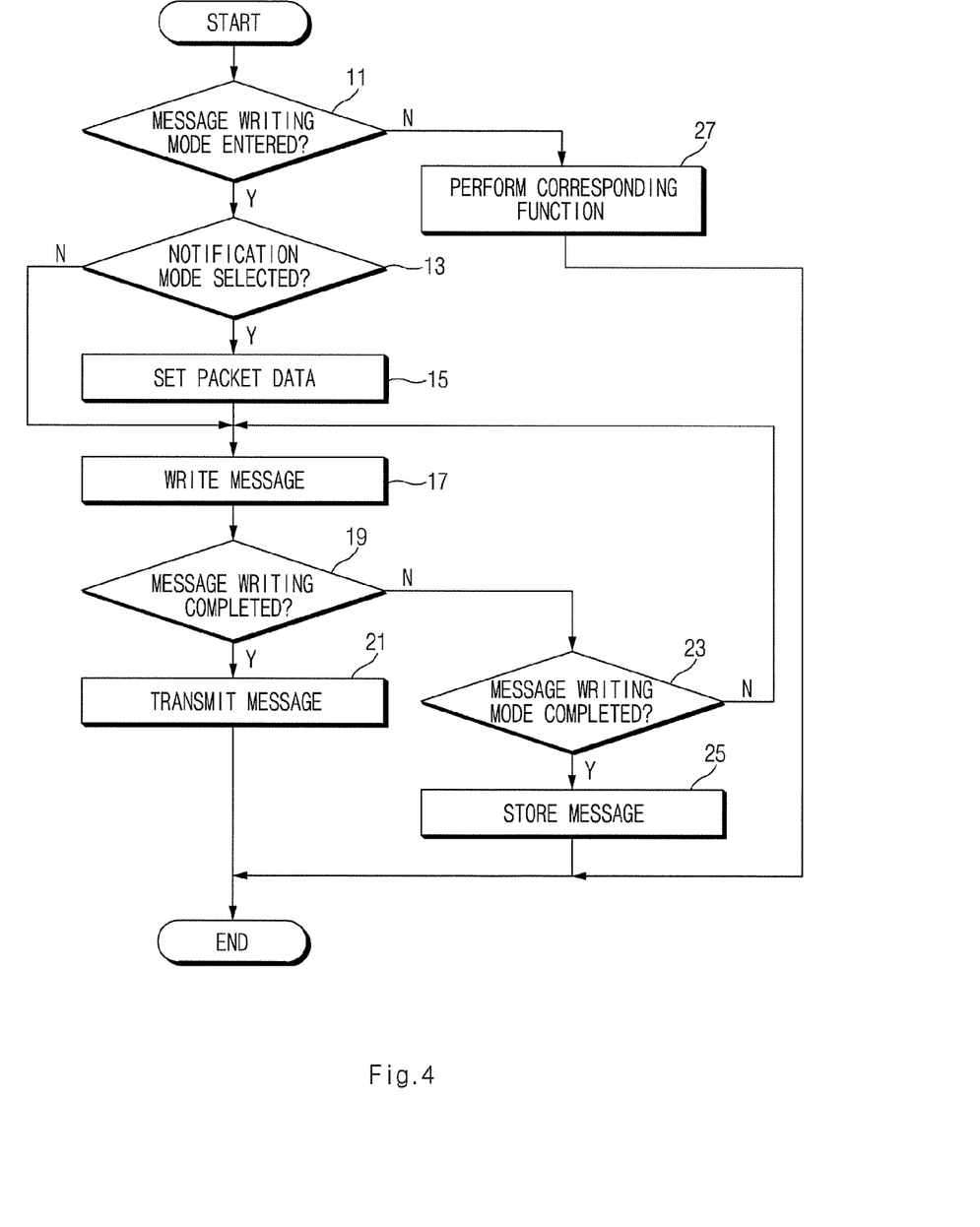
FIG. 4 is a flowchart illustrating a method of transmitting a message according to an embodiment of the present disclosure.

FIG. 4 is a flowchart illustrating a method of transmitting a message according to an embodiment of the present disclosure.

In operation 11, referring to FIGS. 1, 2, and 4, upon the receipt of a signal for entering a message writing mode from the first input unit 120, the first controller 150 may enter a message writing mode. For example, upon the receipt of an event, such as a menu selection event for requesting message writing in a message reception checking state, an icon selection event relating to message writing, and a key button selection event relating to message writing, the first controller 150 may enter a message writing mode. The first output unit 130 may output a message writing window. The first output unit 130 may further output a display area, a menu window, or a pop-op window including items to select the first notification mode. On the other hand, when the signal for entering the message writing mode is not received in operation 11, the first controller 150 may maintain a standby state of a sleep state of the first electronic device 100. If the first controller 150 received not the signal for entering the message writing mode but a specific signal, the first controller 150 may perform a specific function in operation 27.

In operation 13, upon the receipt of selection for a notification mode (hereinafter referred to as a first notification mode) from the first input unit 120, the mode check unit 151 may proceed to operation 15. For example, a specific item may be selected from a first notification mode selection list. The first notification mode selection list may include first notification mode type selection items or first notification mode priority selection items. At this point, the first notification mode may include information for adjusting a message reception notification of the second electronic device 200.

In operation 15, the first controller 150 may set packet data to correspond to the selected first notification mode. For example, the mode setting unit 152 may input information of a notification mode into an unused Reserved Field when configuring the packet data of a message. For example, the mode setting unit 152 may set packet data by inputting two bits of 11 if the first notification mode is a mute mode, two bits of 10 if the first notification mode is a lamp flash mode, two bits of 01 if the first notification mode is a vibration mode, and two bits of 00 if the first notification mode is a ring tone mode.

In operation 17, the first controller 150 may write a message on the basis of a signal inputted through the first input unit 120. When a completion signal on the writing completion of the message is transmitted from the first input unit 120 in operation 19, the first controller 150 may proceed to operation 21 and may then transmit a writing completed message to the second electronic device 200. On the other hand, when the completion signal is not transmitted from the first input unit 120 in operation 19, the first controller 150 may proceed to operation 23. When a signal for terminating a message writing mode is received from the input unit 120 in operation 23, the first controller 150 may proceed to operation 25 and may then store a message being written and terminate a message writing mode. Furthermore, when the signal for terminating the message writing mode is not received from the input unit 120 in operation 23, the first controller 150 may return to operation 17 to perform message writing.

Figure 5:
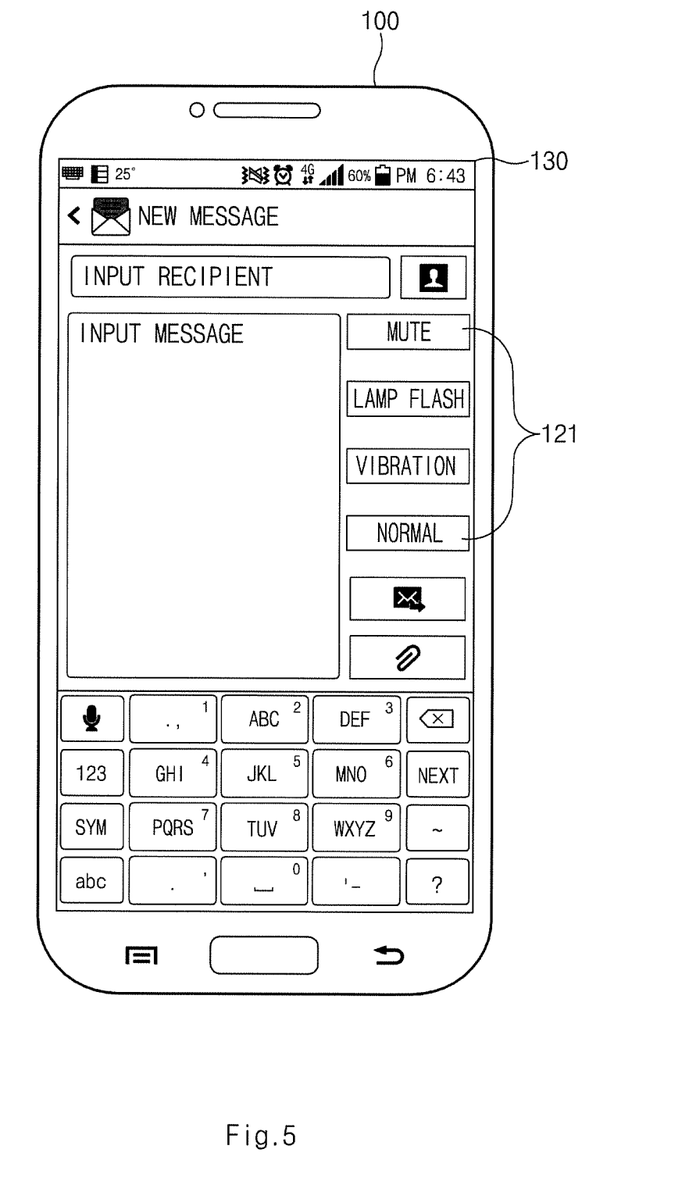
FIG. 5 illustrates a message writing screen for controlling a notification setting of a message according to an embodiment of the present disclosure.

FIG. 5 illustrates a message writing screen for controlling a notification setting of a message according to an embodiment of the present disclosure.

Referring to FIG. 5, the first electronic device 100 may display a screen for writing a message on a first output unit 130, and for selecting a notification mode as shown in 121 at the right of a screen where a message is displayed. At this point, a type of the notification mode may include a mute mode, a lamp flash mode, a vibration mode, and a normal mode (for example, a ring tone mode) and also may include at least two modes thereof.

Figure 6:
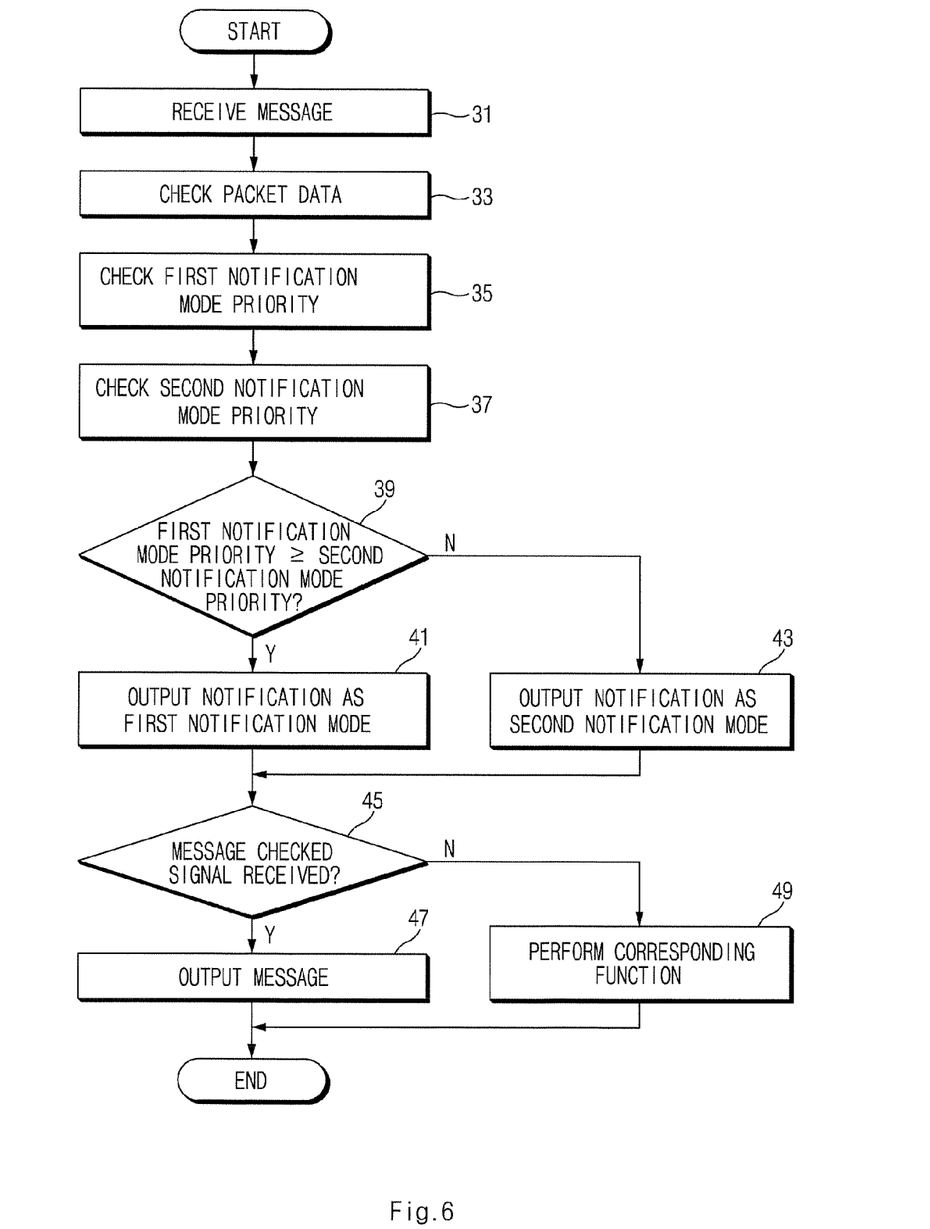
FIG. 6 is a flowchart illustrating a method of receiving a message according to an embodiment of the present disclosure.

FIG. 6 is a flowchart illustrating a method of receiving a message according to an embodiment of the present disclosure.

In operation 31, referring to FIGS. 1, 3, and 6, the second controller 260 may receive a message from the first electronic device 100 through the second communication unit 210. In operation 33, the second controller 260 may check the packet data of the received message. Then, the mode extraction unit 261 may check the first notification information inputted into the Reserved Field of the packet data so as to check the first notification mode set by the first electronic device 100.

In operation 35, the mode extraction unit 261 may confirm the checked priority of the first notification mode, and in operation 37, the mode extraction unit 261 may check the preset priority of the second notification mode stored in the mode storage unit 251 of the second storage unit 250. In operation 39, the mode comparison unit 262 may compare the priority of the first notification mode and the preset priority of the second notification mode. On the basis of a comparison result, if the first notification mode priority is higher than or equal to the second notification mode priority, the mode comparison unit 262 may proceed to operation 41 and if not, the mode comparison unit 262 may proceed to operation 43.

In operation 41, the mode application unit 263 may set the preset second notification mode as the first notification mode, and may output a notification corresponding to the set first notification mode. On the other hand, in operation 43, the mode application unit 263 may maintain the preset second notification mode as it is, and may output a notification corresponding to the second notification mode.

As an embodiment is described with reference to Table 1, when the first notification mode selected by the first electronic device 100 is a lamp flash mode and the second notification mode preset in the second electronic device 200 is a vibration mode, the second electronic device 200 may notify a message reception in the lamp flash mode because the first notification mode have a higher priority than the second notification mode. On the other hand, when the first notification mode selected by the first electronic device 100 is a ring tone mode and the second notification mode preset in the second electronic device 200 is a mute mode, the second electronic device 200 may output a message reception in the mute mode having a higher priority than the ring tone mode. Furthermore, when the first notification mode selected by the first electronic device 100 is a lamp flash mode and a ring tone mode and the second notification mode preset in the second electronic device 200 is a vibration mode, the second electronic device 200 may notify a message reception in the lamp flash mode having the highest priority among the three notification modes or the vibration mode.

TABLE 1

| First electronic device | | Second electronic device | | |
| --- | --- | --- | --- | --- |
| First notification mode | Priority | Second notification mode | Priority | Actual notification mode |
| Mute mode | 1 | Mute mode | 1 | Mute mode |
|  |  | Lamp flash mode | 2 | Mute mode |
|  |  | Vibration mode | 3 | Mute mode |
|  |  | Ring tone mode | 4 | Mute mode |

TABLE 1-continued

| First electronic device | | Second electronic device | | |
|---|---|---|---|---|
| First notification mode | Priority | Second notification mode | Priority | Actual notification mode |
| Lamp flash mode | 2 | Mute mode | 1 | Mute mode |
| | | Lamp flash mode | 2 | Lamp flash mode |
| | | Vibration mode | 3 | Lamp flash mode |
| | | Ring tone mode | 4 | Lamp flash mode |
| Vibration mode | 3 | Mute mode | 1 | Mute mode |
| | | Lamp flash mode | 2 | Lamp flash mode |
| | | Vibration mode | 3 | Vibration mode |
| | | Ring tone mode | 4 | Vibration mode |
| Ring tone mode | 4 | Mute mode | 1 | Mute mode |
| | | Lamp flash mode | 2 | Lamp flash mode |
| | | Vibration mode | 3 | Vibration mode |
| | | Ring tone mode | 4 | Ring tone mode |

Then, in operation 45, upon the receipt of a check signal for checking a message from the second input unit 220, the second controller 260 may proceed to operation 47 to output the message received from the first electronic device 100 to the second output unit 230. On the other hand, if the check signal is not received, the second controller 260 may proceed to operation 49 so as to continuously perform a function that is being executed in the second electronic device 200 before the message reception.

Figure 7:
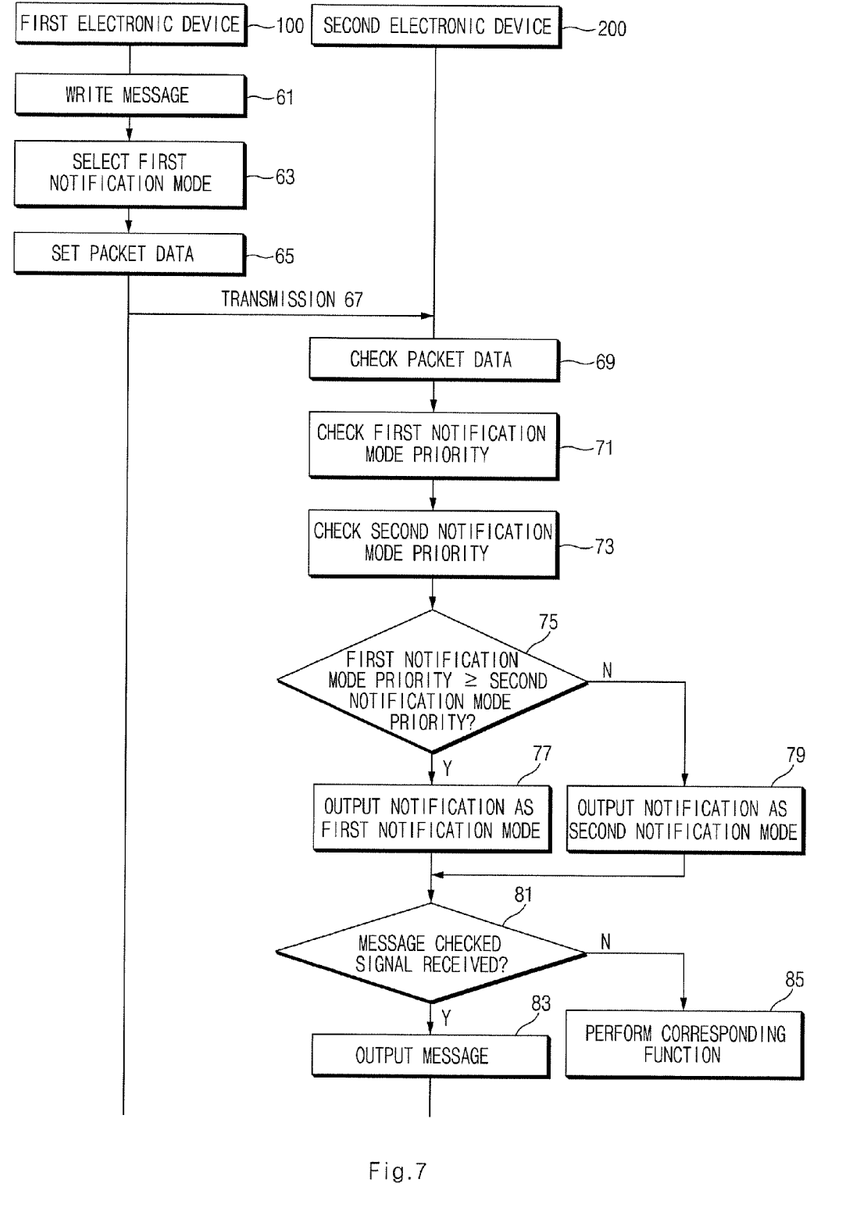
FIG. 7 is a flowchart illustrating a method of controlling a notification setting of a message according to an embodiment of the present disclosure.

FIG. 7 is a flowchart illustrating a method of controlling a notification setting of a message according to an embodiment of the present disclosure.

In operation 61, referring to FIGS. 1 to 7, the first electronic device 100 may enter a message writing mode by an input from a user to write a message, and in operation 63, the first electronic device 100 may select the first notification mode by a user's input. In operation 65, the first electronic device 100 may set packet data to correspond to the selected first notification mode. In operation 67, the first electronic device 100 may transmit, to the second electronic device 200, the message of which the packet data setting is completed.

In operation 69, the second controller 200 receiving the message may check the packet data of the received message. In operation 71, the second electronic device 200 may check the priority of the first notification mode from first notification mode information inputted into the Reserved Field of the packet data. Then, in operation 73, the second electronic device 200 may check the priority of the second notification mode preset in the second electronic device 200.

In operation 75, the second electronic device 200 may compare the priority of the first notification mode and the priority of the second notification mode. On the basis of a comparison result, when the first notification mode priority is higher than or equal to the second notification mode priority, the second electronic device 200 may proceed to operation 77 and if not, the second electronic device 200 may proceed to operation 79.

In operation 77, the second electronic device 200 may set the preset second notification mode as the first notification mode having a higher or equal priority, and may output a notification corresponding to the set first notification mode. On the other hand, in operation 79, the second electronic device 200 may output a notification corresponding to the second notification mode having a lower priority.

In operation 81, upon the receipt of a check signal for checking the message received from a user of the second electronic device 200, the second electronic device 200 may proceed to operation 83 to output the message received from the first electronic device 100. On the other hand, if the check signal is not received in operation 81, the second electronic device 200 may proceed to operation 85 so as to continuously perform a function that is being executed before the second electronic device 200 receives the message.

Figure 8:
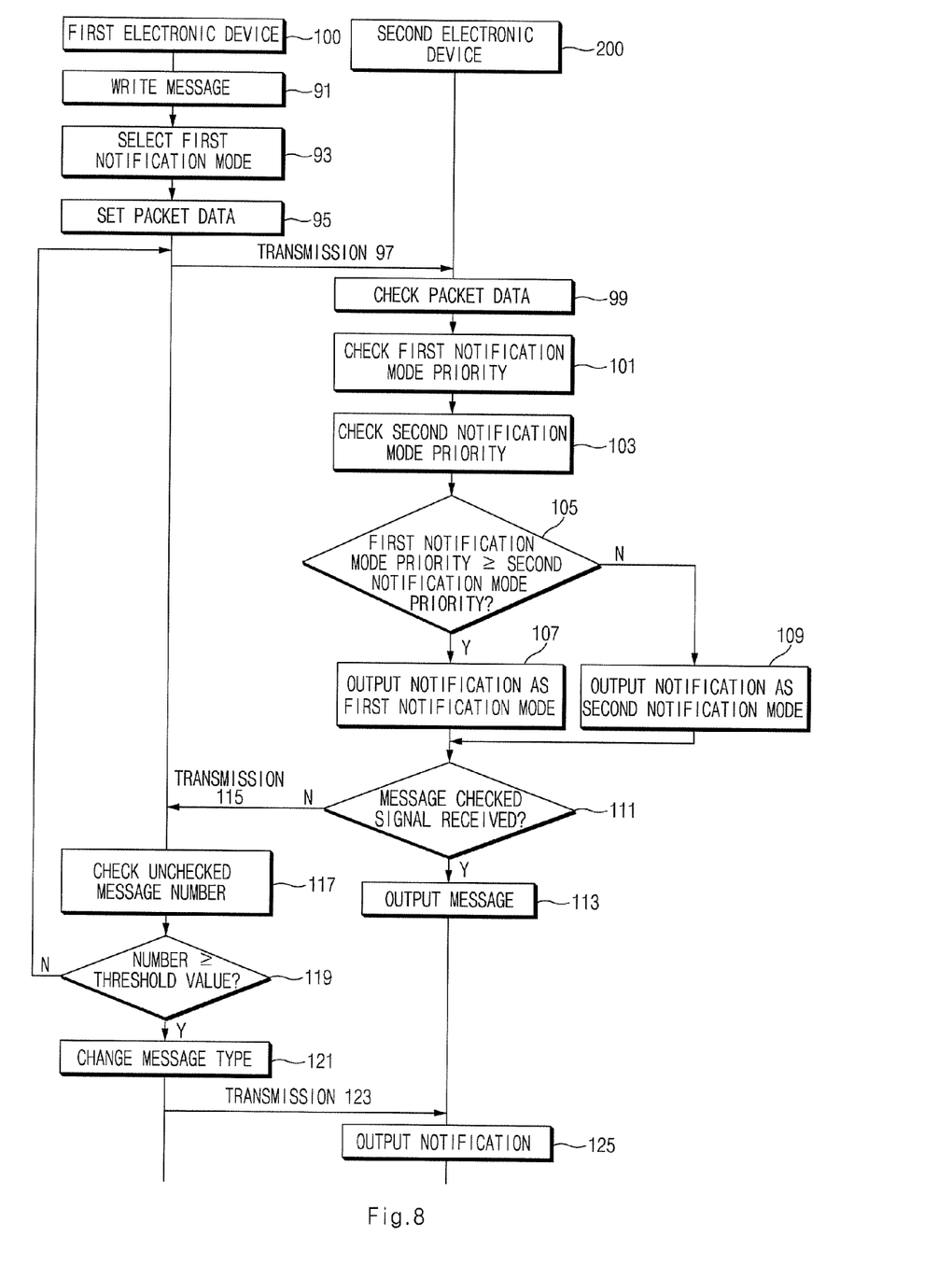
FIG. 8 is a flowchart illustrating a method of controlling a notification setting of a message according to another embodiment of the present disclosure.

FIG. 8 is a flowchart illustrating a method of controlling a notification setting of a message according to another embodiment of the present disclosure.

In operation 91, referring to FIGS. 1 to 8, the first electronic device 100 may enter a message writing mode by an input from a user, and in operation 93, the first electronic device 100 may select the first notification mode by the user's input on the message writing mode. In operation 95, the first electronic device 100 may set packet data to correspond to the selected first notification mode. In operation 97, the first electronic device 100 may transmit, to the second electronic device 200, the message indicating that the setting of the packet data is completed.

In operation 99, the second controller 200 receiving the message may check the packet data of the received message. In operation 101, the second electronic device 200 may check the priority of the first notification mode from first notification mode information inputted into the packet data. Then, in operation 103, the second electronic device 200 may check the priority of the second notification mode preset in the second electronic device.

In operation 105, the second electronic device 200 may compare the priority of the first notification mode and the priority of the second notification mode. On the basis of a comparison result, when the first notification mode priority is higher than or equal to the second notification mode priority, the second electronic device 200 may proceed to operation 107 and if not, the second electronic device 200 may proceed to operation 109.

In operation 107, the second electronic device 200 may output a notification corresponding to the first notification mode having a higher or equal priority. On the other hand, in operation 109, the second electronic device 200 may output a notification corresponding to the second notification mode having a lower priority. In operation 111, upon the input of a check signal for checking the message received from the user, the second electronic device 200 may proceed to operation 113 to output the message received from the first electronic device 100.

On the other hand, if the input of a check signal for checking a message is not received from the user for a predetermined time in operation 111, the second electronic device 200 may transmit a message unchecked signal indicating that the check signal is not inputted to the second electronic device 200 in operation 115. In operation 117, the first electronic device 100 may check the number of unchecked messages at the second electronic device 200, and may proceed to operation 119.

In operation 119, when the number of the unchecked messages is less than a threshold value, the first electronic device 100 returns to operation 97 to re-transmit the message to the second electronic device 200. On the other hand, in operation 121, when the number of the unchecked messages is greater than or equal to the threshold value, the first electronic device 100 may change the type of a message. For example, if the message written in operation 91 is a chatting message such as KakaoTalk message, the first electronic device 100 may change the chatting message into a text message in operation 121. Then, in operation 123, the first electronic device 100 may transmit the type changed message to the second electronic device 200.

In operation 125, the second sensor unit 200 may output a notification for the received message. At this point, the second electronic device 200 may notify the message reception in the second notification mode preset in the second electronic device 200.

In relation to an electronic device and method for controlling a notification setting of a message according to the above-mentioned various embodiments, by setting a notification mode of an electronic device at a reception side to be appropriate for various situations, a notification appropriate for a receiver situation may be provided.

An electronic device and method for controlling a notification setting of a message are described through the embodiments up to now. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
an input unit configured to receive user input;
a communication unit configured to transmit and receive messages; and
a controller configured to set an outgoing message to at least one notification of a plurality of message notifications according to the user input received by the input unit, and to notify of reception of an incoming message to a user by at least one notification of the plurality of message notifications included in the incoming message,
wherein the controller is configured to set the electronic device to one of the plurality of message notifications for any incoming messages,
wherein the controller is configured to check a priority of the one of the plurality of message notifications for any incoming messages and a priority of the at least one notification of the plurality of message notifications included in the incoming message,
wherein, in response to a determination that the priority of the at least one notification of the plurality of message notifications included in the incoming message is equal to or higher than the one of the plurality of message notifications for any incoming messages, the controller is configured to perform the notifying of the reception of the incoming message by the at least one notification of the plurality of message notifications included in the incoming message, and
wherein the priority of the one of the plurality of message notifications for any incoming messages is set based on an input received from the user.

2. The electronic device according to claim 1, wherein setting the outgoing message comprises including information about the at least one notification of a plurality of message notifications into at least one data field of the outgoing message.

3. The electronic device according to claim 1, further comprising:
an output unit configured to output a user interface associated with the at least one notification of the plurality of message notifications included in the incoming message,
wherein the at least one notification included in the incoming message is set by a device transmitting the incoming message.

4. The electronic device according to claim 3, wherein the user interface comprises at least one of ring tone, vibration and ramp flash.

5. The electronic device according to claim 1, further comprising:
an output unit configured to display a graphic user interface (GUI), on a screen of the electronic device, including the plurality of message notifications included in the GUI,
wherein the user input is for selecting the at least one notification from the plurality of message notifications.

6. The electronic device according to claim 5, wherein the plurality or message notifications comprise at least two of ring tone notification, vibration notification, lamp flash notification, and mute notification.

7. The electronic device according to claim 1, wherein the message includes at least one of a text message, a multimedia message, and a chatting message.

8. The electronic device according to claim 1, wherein, in response to a determination that the priority of the at least one notification of the plurality of message notifications included in the incoming message is lower than the one of the plurality of message notifications for any incoming messages, the controller is configured to perform the notifying of the reception of the incoming message by the one of the plurality of message notifications for any incoming messages.

9. A method performed by an electronic device, the method comprising:
receiving a user input;
setting an outgoing message to at least one notification of a plurality of message notifications according to the user input received;
transmitting the outgoing message to a device;
setting the electronic device to one of the plurality of message notifications for any incoming messages;
checking a priority of the one of the plurality of message notifications for any incoming messages and a priority of the at least one notification of the plurality of message notifications included in the incoming message; and
in response to a determination that the priority of the at least one notification of the plurality of message notifications included in the incoming message is equal to or higher than the one of the plurality of message notifications for any incoming messages, performing the notifying of reception of the incoming message by the at least one notification of the plurality of message notifications included in the incoming message, and
wherein the priority of the one of the plurality of message notifications for any incoming messages is set based on an input received from a user.

10. The method according to claim 9, further comprising:
displaying a graphic user interface (GUI), on a screen of the electronic device, including the plurality of message notifications,
wherein the user input is for selecting the at least one notification from the plurality of message notifications included in the GUI.

11. The method according to claim 10, wherein the plurality of message notifications comprise at least two of ring tone notification, vibration notification, lamp flash notification, and mute notification.

12. The method according to claim 9, wherein setting the outgoing message comprises including information about the at least one notification of a plurality of message notifications into at least one data field of the outgoing message.

13. The method according to claim 9, further comprising:
- receiving an incoming message including at least one notification of the plurality of message notifications; and
- notifying of reception of the incoming message based at least in part on the at least one notifications of the plurality of message notifications included in the incoming message.

14. The method according to claim 13, further comprising:
- outputting a user interface associated with the at least one notification of the plurality of message notifications included in the incoming message,
- wherein the at least one notification included in the incoming message are set by a device transmitting the incoming message.

15. The method according to claim 14, wherein the user interface comprises at least one of ring tone, vibration and ramp flash.

16. The method according to claim 13, further comprising:
- comparing a priority of the one of the plurality of message notifications for any incoming messages and a priority of the at least one notification of the plurality of message notifications included in the incoming message to determine a notifying method from the plurality of message notifications.

* * * * *